United States Patent Office 3,786,036
Patented Jan. 15, 1974

3,786,036
PROCESS FOR PRODUCING 2-ALKYL-SUBSTI-
TUTED 1,3-CONJUGATED DIENE POLYMER
Hidetoshi Yasunaga, Tatsusuke Chikatsu, Chihiro Nozaki,
and Yoshinori Yoshida, Yokkaichi, Japan, assignors to
Japan Synthetic Rubber Co., Ltd., Tokyo, Japan
No Drawing. Filed Sept. 3, 1971, Ser. No. 177,877
Claims priority, application Japan, Sept. 18, 1970,
45/81,246; Dec. 7, 1970, 45/107,663
Int. Cl. C08d 3/04
U.S. Cl. 260—94.2 M     22 Claims

ABSTRACT OF THE DISCLOSURE

A 2-alkyl-substituted 1,3-conjugated diene polymer having a high cis-1,4 configuration content and having a high molecular weight can advantageously be produced by polymerizing a 2-alkyl-substituted 1,3-conjugated diene with a catalyst consisting essentially of at least one organolithium compound and carbon disulfide in a proportion of 0.01 to 1.0 mole of carbon disulfide per atom of active lithium and optionally 1,2-diene hydrocarbons. The vulcanizate of said polymer is very similar in physical properties to that of a natural Hevea rubber.

---

This invention relates to a process for producing a 2-alkyl-substituted 1,3-conjugated diene polymer. More particularly, it relates to a process for producing said polymer with a novel catalyst.

There has already been known a process for polymerizing a 2-alkyl-substituted 1,3-conjugated diene with an organolithium compound used as a polymerization initiator.

Major criterions for evaluating practical usefulness of the 2-alkyl-substituted 1,3-conjugated diene polymers produced by such a process include microstructural composition and molecular weight of the polymer. For example, an isoprene polymer containing an extremely high proportion of cis-1,4 configuration has had a high usefulness and a wide application area, because it is remarkably resemble to the natural Hevea rubber in mechanical properties, chemical properties and physical properties.

Consequently, in recent years, a number of proposals have been made concerning the preparation of isoprene polymers with a high cis-1,4 content by use of metallic lithium or an organolithium compound as a polymerization initiator (refer to, for example, Japanese patent publication Nos. 4,746/58 and 17,194/63).

However, conventional processes for producing isoprene polymers with a catalyst, the catalytic component of which is only metallic lithium or an organolithium compound (hereinafter referred to as "lithium-based unitary catalyst"), are not sufficiently satisfactory because there are still some problems in both manufacturing operation and physical properties of the manufactured polymer. For example, the cis-1,4 content in isoprene polymers obtained by using a lithium-based unitary catalyst is, even at its maximum value, lower than that of a natural Hevea rubber. This is an essential factor which enables the natural Hevea rubber to maintain its superiority in practical physical properties. Furthermore, in the polymerization of isoprene with a lithium-based unitary catalyst, the amount of the catalyst added bears a sensitive correspondence to the cis-1,4 content of the isoprene polymer formed, and the latter decreases generally with an increase of the former. This correspondence is especially remarkable in the case of an easily hydrocarbon-soluble organolithium compound such as n-butyllithium. Therefore, in manufacturing an isoprene polymer having a cis-1,4 content of 90% or more, it is necessary to keep the amount of catalyst in an extremely low and limited narrow range. Consequently, in conventional processes, there has often been found the defect that unstable and disadvantageous results with respect to the rate and yield of polymerization are brought about, even when carefully purified starting materials are used.

An object of this invention is to solve the above-mentioned problems present in the conventional processes in which a lithium-based unitary catalyst is used, and particularly to provide a process for advantageously producing 2-alkyl-substituted 1,3-conjugated diene polymers having a high cis-1,4 content.

This invention provides a process for producing a 2-alkyl-substituted 1,3-conjugated diene polymer by polymerizing a 2-alkyl-substituted 1,3-conjugated diene in the presence or absence of a hydrocarbon solvent, characterized by using a catalyst consisting essentially of at least one organolithium compound and carbon disulfide in a proportion of 0.01 to 1.0 mole of carbon disulfide per atom of active lithium, and optionally using 1,2-diene hydrocarbons as molecular weight regulator.

According to this invention, there is obtained an isoprene polymer having a reduced trans-1,4 content and a markedly increased cis-1,4 content in comparison with an isoprene polymer produced with a lithium-based unitary catalyst; there is also obtained with ease an isoprene polymer having a higher molecular weight in comparison with an isoprene polymer produced with a lithium-based unitary catalyst. It should also be noted that the isoprene polymer obtained according to the process of this invention gives, in addition, a tough vulcanizate which is more resemble in physical properties to that of a natural Hevea rubber.

From these results, it can be said that the catalyst consisting essentially of at least one organolithium compound and carbon disulfide according to this invention is a novel and useful polymerization catalyst, which is essentially different from the conventional lithium-based unitary catalyst.

The polymerization in the process of this invention is effected by contacting a 2-alkyl-substituted 1,3-conjugated diene, particularly isoprene, with the catalyst consisting essentially of an organolithium compound and carbon disulfide generally in a hydrocarbon medium.

Preferable examples of the organolithium compounds to be used for the formation of the catalyst of this invention are monolithiumhydrocarbons (preferably having 1 to 16 carbon atoms), such as methyllithium, ethyllithium, propyllithium, butyllithium, amyllithium, hexyllithium, phenyllithium, and naphthyllithium; polylithiumhydrocarbons (preferably having 1 to 16 carbon atoms), such as methylenedilithium, ethylenedilithium, trimethylenedilithium, tetramethylenedilithium, 1,4-dilithiumbenzene, diisoprenyldilithium, dibutadienyldilithium, distyrenyldilithium; and mixtures of these compounds.

Mixing of the organolithium compound and carbon disulfide is usually carried out at a temperature of from −50° C. to 100° C.

The proportion of carbon disulfide to the organolithium compound is in the range of 0.01 to 1.0 mole, preferably 0.03 to 0.5 mole per atom of active lithium. When the proportion of carbon disulfide is smaller than 0.01 mole, the effects of its use are insufficient, while the rate of polymerization is markedly decreased when said proportion exceeds 1.0 mole.

In the present invention, the organolithium compound may in advance be mixed with carbon disulfide, followed by contacting a monomer with the mixture or the organolithium compound and carbon disulfide may separately be added to a monomer or to a solution of a monomer in a hydrocarbon solvent.

The amount of the catalyst used in this invention is 0.01 to 100 milligram equivalent, preferably 0.05 to 10 milligram equivalent, in terms of an active lithium atom in the catalyst per mole of the monomer.

The alkyl group in the 2 - alkyl - substituted 1,3-conjugated diene for use in the process of this invention is a lower alkyl group having 1 to 5 carbon atoms. Examples of such dienes are isoprene, 2-ethyl-1,3-butadiene, 2-n-propyl-1,3-butadiene, 2-isopropyl-1,3-butadiene, 2-n-butyl-1,3-butadiene, 2-methyl-1,3-pentadiene, and the like. The 2-alkyl-substituted 1,3-conjugated dienes have preferably 5 to 10 carbon atoms. Isoprene is most preferable.

The polymerization is conducted in the presence or absence of a hydrocarbon solvent. Examples of suitable hydrocarbon solvents are paraffinic hydrocarbons (preferably having 4 to 10 carbon atoms), such as butane, pentane, hexane, heptane, octane, cyclopentane, and cyclohexane; monoolefinic hydrocarbons (preferably having 4 to 10 carbon atoms), such as butene, pentene, hexene, and heptene; aromatic hydrocarbons (preferably having 6 to 10 carbon atoms), such as benzene, toluene, and xylene; and mixtures of these hydrocarbons. In the case where a $C_5$-hydrocarbon fraction of naphtha crack containing isoprene from which cyclopentadiene, acetylenes and the like have been removed is subjected to the present polymerization, the polymerization may proceed without using the above-mentioned solvent.

When a 2-alkyl-substituted 1,3-conjugated diene is polymerized in the presence of at least one organolithium compound and carbon disulfide as polymerization catalyst according to this invention, a molecular weight of the polymer obtained may be controlled without substantially decreasing the extremely high proportion of cis-1,4 configuration of the polymer by using as molecular weight regulator 1,2-diene hydrocarbons represented by the formula:

$$CH_2=C=CR^1R^2$$

wherein $R^1$ and $R^2$ represent hydrogen or alkyl groups having 1 to 8 carbon atoms and the total number of carbon atoms is 3 to 11.

The 1,2-diene hydrocarbons usable in this invention may be any 1,2-diene of the above structural formula. For example, 1,2-propadiene, 1,2-butadiene, 1,2-pentadiene, 1,2-hexadiene, 1,2-heptadiene, 1,2-octadiene, 1,2-nonadiene, 1,2-decadiene, 3-methyl-1,2-butadiene, 3-ethyl-1,2-pentadiene, 4-methyl-1,2-hexadiene, 4-propyl-1,2-heptadiene, 5-methyl-1,2-octadiene, and the like may be used. Among them, 1,2-propadiene, 1,2-butadiene, 1,2-pentadiene and 1,2-hexadiene are most preferable in respect of cost and effect as molecular weight regulator. The above molecular weight regulators may be used in admixture.

The larger the amount of the 1,2-diene, the lower the molecular weight of the polymer is obtained. In this case, no change of the content of cis-1,4-configuration is found in the polymer. Therefore, the molecular weight of the polymer can be controlled to the desired value by selecting a suitable amount of the 1,2-diene to be used or selecting a suitable time of adding the 1,2-diene during the polymerization.

The amount of the 1,2-diene used in this invention is ordinarily 50 to 5000 p.p.m., preferably 100 to 2000 p.p.m., to the monomer. When the amount of 1,2-diene is too small, the substantial effect of controlling the molecular weight of the polymer is not attained. When the amount of 1,2-diene is, on the other hand, too large, the polymerization is disturbed.

The polymerization operation may be carried out either continuously or batchwise by contacting the catalyst of this invention with a monomer in a conventional manner. The pressure of the reaction system may be any pressure which is sufficient to maintain the reaction mixture in the liquid phase, and is ordinarily from atmospheric pressure to about 10 atmospheres. The polymerization temperature is usually in the range of from $-50°$ to $+100°$ C. The polymerization is preferably conducted under atmosphere of an inert gas such as nitrogen, argon, and helium.

After completion of the polymerization, the polymerization product is obtained as a solid when no solvent has been used, and as a viscous solution when a solvent has been used. In the latter case, the reaction is terminated by adding a deactivating agent for catalyst, such as water, an alcohol, an organic acid, or the like, and after addition of antioxidant, such as phenyl-$\beta$-naphthylamine, the solvent is removed in a conventional manner to obtain the objective polymer.

The invention is further explained below with reference to examples, which are not by way of limitation but only by way of illustration.

In the examples, intrinsic viscosities were measured by means of an Ubbelohde viscosimeter in toluene at 30° C. The microstructural compositions of polymer were determined by high resolution nuclear magnetic resonance spectroscopic method (100 mHz.) (refer to Kawakami, Ohno and Tanaka, The 20th Annual Meeting of Polymer Society of Japan, 1971, Tokyo).

EXAMPLE 1

Into a 4-liter, stainless-steel autoclave, which had been flushed with dry nitrogen, were charged 500 g. of high-purity isoprene monomer and 1500 g. of n-heptane. To the autoclave was further added a catalysts as prepared by intimately mixing at room temperature 1.5 millimoles of n-butyllithium diluted with n-heptane and 0.3 millimole of carbon disulfide. After having been tightly closed, the autoclave was heated to 40° C. The polymerization started after several minutes, and was continued with stirring. After 7 hours, a conversion of 99.6% was reached. Methanol containing phenyl-$\beta$-naphthylamine was thereafter added to the reaction system and a viscous polymer solution was then withdrawn. The solvent was removed therefrom by steam distillation, and the residue was dried in vacuo to obtain a rubber-like polymer of isoprene (Sample A of this invention).

On the other hand, for comparison, the above procedure was repeated, except that 1.5 or 1.2 millimoles of n-butyllithium alone was used as the polymerization catalyst. After 4.5 or 6 hours of polymerization, an isoprene polymer was obtained with a conversion of 99.5 or 99.2% (Sample B or C for comparison), respectively.

The above procedure was again repeated, for further comparison, except that a decreased amount, i.e., 0.8 millimole of n-butyllithium alone was used as a single component catalyst. After 9 hours, a conversion of 83% was reached. As the polymerization did not further proceed beyond said conversion, the reaction system was admixed with methanol containing phenyl-$\beta$-naphthylamine, the solvent was removed therefrom, and the residue was dried to obtain an isoprene polymer (Sample D for comparison).

Measurements of the intrinsic viscosity and the microstructural composition were made on the abovementioned four samples to obtain the results as shown in Table 1.

TABLE 1

| Item of measurement | Sample A of this invention | Sample B for comparison | Sample C for comparison | Sample D for comparison |
|---|---|---|---|---|
| Catalyst: | | | | |
| n-Butyllithium (mmol.) | 1.5 | 1.5 | 1.2 | 0.8 |
| Carbon disulfide (mmol.) | 0.3 | 0 | 0 | 0 |
| Microstructural composition: | | | | |
| Cis-1,4 linkage (percent) | 96.2 | 83.2 | 86.4 | 91.5 |
| Trans-1,4 linkage (percent) | 0.8 | 11.0 | 8.0 | 4.2 |
| 1,2 linkage (percent) | 0 | 0 | 0 | 0 |
| 3,4 linkage (percent) | 3.0 | 5.8 | 5.6 | 4.3 |
| [$\eta$] at 30° C, in toluene (dl./g.) | 10.4 | 4.2 | 4.7 | 6.3 |
| Gel content (percent) | 0 | 0 | 0 | 0 |

From these results, it is seen that the catalyst according to this invention produced a polymer having a markedly high cis-1,4 content with substantially no trans-1,4 linkage.

Further, these samples were compounded on a roller mill according to the compounding formulation shown in Table 2 (temperature of roll: 70±5° C.; time of compounding: 20 minutes).

Table 2

| Compounding ingredient: | Parts by weight |
|---|---|
| Polymer | 100 |
| Carbon black, HAF grade | 50 |
| Aromatic oil | 5.0 |
| Antioxidant | 1.0 |
| Zinc oxide | 3.0 |
| Stearic acid | 2.5 |
| Sulfur | 1.5 |
| Vulcanization accelerator* | 0.6 |

*N-cyclohexylbenzothiazyl sulfenamide.

The thus obtained compounds were vulcanized at 145° C. for 30 minutes in a known way, to obtain a vulcanized rubber having physical properties as shown in Table 3.

TABLE 3

| Physical property | Sample A of this invention | Sample B for comparison | Sample C for comparison | Sample D for comparison |
|---|---|---|---|---|
| 300% modulus (kg./cm.$^2$) | 102 | 79 | 81 | 90 |
| Tensile strength (kg./cm.$^2$) | 303 | 219 | 225 | 258 |
| Elongation (percent) | 700 | 680 | 670 | 680 |
| Tear strength (kg./cm.$^2$) | 69 | 45 | 46 | 53 |
| Hardness | 57 | 56 | 56 | 56 |

Note.—Measurements were made under the conditions as specified in JIS K-6301, JIS being an abbreviation of "Japanese Industrial Standard."

From the results, it is seen that the isoprene polymer obtained according to this invention can give a tough vulcanizate.

EXAMPLES 2 TO 4 AND COMPARATIVE EXAMPLES 1 TO 5

In a manner similar to that in Example 1, 300 g. of isoprene monomer and 1800 g. of n-pentane as solvent were charged into an autoclave. Polymerization was effected with a catalyst according to this invention, said catalyst having been obtained by intimately mixing carbon disulfide with n-butyllithium (Examples 2 to 4). For comparison, polymerization was effected with n-butyllithium alone as catalyst (Comparative Examples 1 to 3), and n-butyllithium and carbon disulfide, the amount of the latter being outside the range of this invention (Comparative Examples 4 and 5). The conditions for the polymerization and the results obtained were as shown in Table 4.

In all the cases, the polymerization temperature was 40° C. and the conditions for polymerization other than set forth in Table 4 were the same.

It is seen from the above results that the catalyst of this invention produced a polymer having a much higher cis-1,4 content as well as a higher molecular weight than obtained by the conventional method.

EXAMPLES 5 AND 6

Into a 4-liter, stainless-steel autoclave, which had been flushed with dry nitrogen, were charged 500 g. of high-purity isoprene monomer and 1500 g. of n-heptane. To this autoclave was further added a catalyst as prepared by intimately mixing at 35° C. 2.5 millimoles of n-butyllithium diluted with n-heptane and 0.6 millimole of carbon disulfide. After the autoclave had been tightly closed, polymerization was allowed to proceed at 35° C. for 6 hours to obtain polyisoprene, the polymerization conversion having been 99.8% (Example 5).

Into the same autoclave as above were charged 500 g. of isoprene monomer and 1500 g. of n-heptane, and then 2.5 millimoles of n-butyllithium and 0.6 millimole of carbon disulfide were separately charged. After the autoclave had been closed tightly, polymerization was allowed to proceed for 6 hours to obtain polyisoprene, the conversion having been 100.0% (Example 6).

The microstructure, [$\eta$] at 30° C. in toluene, and the gel content were determined on these two samples to obtain the results as shown in Table 5.

TABLE 5

| Item of measurement | Example 5 | Example 6 |
|---|---|---|
| Microstructural composition: | | |
| Cis-1,4 linkage (percent) | 95.3 | 95.0 |
| Trans-1,4 linkage (percent) | 1.3 | 1.4 |
| 1,2 linkage (percent) | 0 | 0 |
| 3,4 linkage (percent) | 3.4 | 3.6 |
| [$\eta$] at 30° C. in toluene (dl./g.) | 8.6 | 9.0 |
| Gel content (percent) | 0 | 0 |

EXAMPLE 7 AND COMPARATIVE EXAMPLE 6

Into a 1-liter, stainless-steel autoclave, which had been flushed with dry nitrogen, was charged 500 g. of high-purity isoprene monomer, and then further were added 0.4 millimole of n-amyllithium and 0.1 millimole of carbon disulfide as catalyst. After having been tightly closed, the autoclave was heated to 30° C. The polymerization started after 10 minutes, and was continued with stirring. After 4 hours, a conversion of 55.6% was reached, and immediately thereafter, polymerization was stopped by adding methanol to the autoclave. The resulting semi-solid polymer solution was poured into methanol containing phenyl-$\beta$-naphthylamine, to coagulate the polymer, and thus coagulated polymer was dried in vacuo. Thus, a rubbery polyisoprene was obtained (Example 7).

The above procedure was repeated, for comparison, except that 0.4 millimole of n-amyllithium alone was used as the catalyst. After 3 hours, a conversion of 57.0% was reached, and a solid rubbery polyisoprene was ob-

TABLE 4

| | Example No. | | | Comparative Example No. | | | | |
|---|---|---|---|---|---|---|---|---|
| | 2 | 3 | 4 | 1 | 2 | 3 | 4 | 5 |
| n-Butyllithium (mmol.) | 1.2 | 2.0 | 1.4 | 1.0 | 1.5 | 2.0 | 1.5 | 2.0 |
| Carbon disulfide (mmol.) | 0.2 | 0.4 | 0.1 | 0 | 0 | 0 | 0.01 | 2.5 |
| Temperature for preparation of catalyst (° C.) | 0 | 40 | 10 | | | | 10 | 20 |
| Polymerization time (hrs.) | 8.0 | 5.5 | 6.0 | 7.5 | 5.0 | 3.5 | 5.5 | |
| Conversion (percent) | 99.7 | 99.8 | 99.4 | 98.6 | 99.0 | 99.4 | 99.7 | (¹) |
| Microstructural composition: | | | | | | | | |
| Cis-1,4 linkage (percent) | 95.4 | 95.0 | 93.5 | 90.2 | 84.4 | 79.6 | 84.0 | |
| Trans-1,4 linkage (percent) | 1.1 | 1.4 | 2.0 | 5.1 | 9.7 | 14.4 | 10.1 | |
| 1,2 linkage (percent) | 0 | 0 | 0 | 0 | 0 | 0 | 0 | |
| 3,4 linkage (percent) | 3.5 | 3.6 | 4.5 | 4.7 | 5.9 | 6.0 | 5.9 | |
| [$\eta$] at 30° C., in toluene (dl./g.) | 10.5 | 9.6 | 7.0 | 5.2 | 3.8 | 2.5 | 3.6 | |
| Gel content (percent) | 0 | 0 | 0 | 0 | 0 | 0 | 0 | |

¹ No polymer.

tained by the same method (Comparative Example 6). The results obtained were as shown in Table 6.

TABLE 6

|  | Example 7 | Comparative Example 6 |
|---|---|---|
| Catalyst: |  |  |
| n-Amyllithium (mmol.) | 0.4 | 0.4 |
| Carbon disulfide (mmol.) | 0.1 | 0 |
| Polymer: |  |  |
| Microstructural composition: |  |  |
| Cis-1,4 linkage (percent) | 96.1 | 85.3 |
| Trans-1,4 linkage (percent) | 1.0 | 9.0 |
| 1,2 linkage (percent) | 0 | 0 |
| 3,4 linkage (percent) | 2.9 | 5.7 |
| [η] at 30° C., in toluene (dl./g.) | 10.1 | 5.7 |
| Gel content (percent) | 0 | 0 | ment Nos. 1 and 2 were added 0.8 and 2.2 millimoles of n-butyllithium alone, respectively. To each autoclave in Experiment Nos. 3, 4 and 5 was added a catalyst prepared by intimately mixing at room temperature 2.2 millimoles of n-butyllithium and 0.5 millimole of carbon disulfide. Furthermore, to the autoclaves in Experiment Nos. 4 and 5 were added 0.3 g. and 0.6 g. of 1,2-propadiene, respectively. All the above procedures were carried out under a nitrogen atmosphere in a short period. After having been tightly closed, these autoclaves were heated to 40° C. and polymerization was carried out under stirring. After completing the polymerization, polymers were obtained in a similar way to that in Example 1. The results were as shown in Table 8.

TABLE 8

|  | Comparative Example 8 | Comparative Example 9 | Example 9 | Example 10 | Example 11 |
|---|---|---|---|---|---|
| Experiment number | 1 | 2 | 3 | 4 | 5 |
| Catalyst composition: |  |  |  |  |  |
| n-Butyllithium (mmol.) | 0.8 | 2.2 | 2.2 | 2.2 | 2.2 |
| Carbon disulfide (mmol.) | 0 | 0 | 0.5 | 0.5 | 0.5 |
| 1,2-propadiene (g.) | 0 | 0 | 0 | 0.3 | 0.6 |
| Reaction time (hrs.) | 10 | 4 | 6 | 6 | 7 |
| Conversion (percent) | 87.5 | 99.7 | 99.5 | 99.8 | 99.0 |
| Polymer: |  |  |  |  |  |
| Microstructural composition: |  |  |  |  |  |
| Cis-1,4 linkage (percent) | 91.8 | 83.0 | 95.8 | 96.0 | 95.7 |
| Trans-1,4 linkage (percent) | 3.9 | 10.9 | 0.7 | 0.4 | 0.8 |
| 1,2 linkage (percent) | 0 | 0 | 0 | 0 | 0 |
| 3,4 linkage (percent) | 4.3 | 6.1 | 3.5 | 3.6 | 3.5 |
| [η] at 30° C., in toluene (dl./g.) | 6.7 | 3.6 | 8.1 | 6.0 | 4.3 |
| Gel content (percent) | 0 | 0 | 0 | 0 | 0 |

EXAMPLE 8 AND COMPARATIVE EXAMPLE 7

Into a 500-milliliter, pressure-proof glass bottle, which had been flushed with dry nitrogen, were charged 200 g. of cyclohexane and 50 g. of high-purity 2-n-propyl-1,3-butadiene, and thereafter was added a catalyst prepared by intimately contacting at 50° C. for 1 hour 0.15 millimole of n-butyllithium with 0.02 millimole of carbon disulfide. Polymerization was carried out at a temperature of 45° C. by revolving the bottle in a water-bath. After 10 hours, a conversion of 99.4% was reached. Rubbery poly-(2-n-propyl-1,3-butadiene) was obtained in a similar way to that in Example 1 (Example 8).

For comparison, the above procedure was repeated except that 0.15 millimole of n-butyllithium alone was used as a catalyst. After 10 hours, a conversion of 99.8% was reached, and poly-(2-n-propyl-1,3-butadiene) was obtained (Comparative Example 7). The results were as shown in Table 7.

TABLE 7

|  | Example 8 | Comparative Example 7 |
|---|---|---|
| Catalyst: |  |  |
| n-Butyllithium (mmol.) | 0.15 | 0.15 |
| Carbon disulfide (mmol.) | 0.02 | 0 |
| Polymer: |  |  |
| Microstructural composition: |  |  |
| Cis-1,4 linkage (percent) | 95.0 | 91.2 |
| Trans-1,4 linkage (percent) | 0.9 | 4.0 |
| 1,2 linkage (percent) | 0 | 0 |
| 3,4 linkage (percent) | 4.1 | 4.8 |
| [η] at 30° C., in toluene (dl./g.) | 9.2 | 6.0 |
| Gel content (percent) | 0 | 0 |

EXAMPLES 9 TO 11 AND COMPARATIVE EXAMPLES 8 TO 9

Into each of five 4-liter, stainless steel autoclaves, which had been flushed with dry nitrogen, were charged 300 g. of high-purity isoprene monomer and 1500 g. of n-heptane (Experiment Nos. 1 to 5). To the autoclaves in Experi- From these results, it is seen that polymers having a markedly high cis-1,4 content and various molecular weights are produced by using the catalyst according to this invention and 1,2-diene hydrocarbons as molecular weight regulator.

EXAMPLES 12 TO 14

In a similar manner to that in Examples 10 and 11, 500 g. of high-purity isoprene monomer, 1500 g. of n-hexane, a catalyst prepared by intimately mixing 1.6 millimoles of n-butyllithium diluted with n-hexane with 0.3 millimole of carbon disulfide, and various amounts of 1,2-butadiene were charged into three autoclaves (Examples 12 to 14). Polymerization was carried out at 45° C. Results were as shown in Table 9.

TABLE 9

|  | Example 12 | Example 13 | Example 14 |
|---|---|---|---|
| 1,2-butadiene (g.) | 0.2 | 0.4 | 0.8 |
| Reaction time (hrs.) | 7 | 8 | 8 |
| Conversion (percent) | 99.5 | 99.4 | 98.6 |
| Polymer: |  |  |  |
| Microstructural composition: |  |  |  |
| Cis-1,4 linkage (percent) | 96.0 | 95.9 | 96.1 |
| Trans-1,4 linkage (percent) | 0.5 | 0.5 | 0.4 |
| 1,2 linkage (percent) | 0 | 0 | 0 |
| 3,4 linkage (percent) | 3.5 | 3.6 | 3.5 |
| [η] at 30° C., in toluene (dl./g.) | 10.2 | 8.7 | 6.5 |
| Gel content (percent) | 0 | 0 | 0 |

What is claimed is:

1. A process for producing a 2-alkyl-substituted 1,3-conjugated diene polymer having a high cis 1,4-configuration which comprises adding a catalyst formed from at least one organolithium compound and carbon disulfide wherein the carbon disulfide is present in a proportion of 0.01 to 1.0 mole of carbon disulfide per atom of active lithium, to a 2-alkyl-substituted 1,3-conjugated diene monomer in the presence or absence of a solvent, and effecting polymerization.

2. A process according to claim 1, wherein the organolithium compound and the carbon disulfide are first admixed together and then added to the monomer.

3. The process according to claim 1, wherein the carbon disulfide and organolithium compound are separately added to the monomer.

4. The process according to claim 1, wherein from 0.01 to 100 mg. equivalent in terms of active lithium atom of the catalyst per mole of the monomer is added to produce a polymer containing at least 93.5% of the polymer in the cis 1,4-configuration.

5. A process according to claim 1, wherein the amount of the catalyst is 0.01 to 100 milligram atom in terms of active lithium atom per mole of the 2-alkyl-substituted 1,3-conjugated diene.

6. A process according to claim 1, wherein the polymerization is conducted under a pressure of from atmospheric pressure to 10 atmospheres at a temperature of from −50° to +100° C.

7. A process according to claim 1, wherein the polymerization is conducted under an inert atmosphere.

8. A process according to claim 1, wherein the alkyl group of the 2-alkyl-substituted 1,3-conjugated diene has 1 to 5 carbon atoms.

9. A process according to claim 1, wherein the 2-alkyl-substituted 1,3-conjugated diene is isoprene, 2-ethyl-1,3-butadiene, 2-n-propyl-1,3-butadiene, 2 - isopropyl 1,3-butadiene, 2-n-butyl - 1,3 - butadiene or 2 - methyl - 1,3-pentadiene.

10. A process according to claim 1, wherein the 2-alkyl-substituted 1,3-conjugated diene is isoprene.

11. A process according to claim 1, wherein the reaction is conducted in the presence of a hydrocarbon solvent selected from paraffinic hydrocarbons, mono-olefinic hydrocarbons, aromatic hydrocarbons, and mixtures of these hydrocarbons.

12. A process according to claim 11, wherein the hydrocarbon solvent is butane, pentane, hexane, heptane, octane, cyclopentane, cyclohexane, butene, pentene, hexene, heptene, benzene, toluene, or xylene.

13. A process according to claim 1, wherein the organolithium compound is a monolithiumhydrocarbon, a polylithiumhydrocarbon, or a mixture of these compounds.

14. A process according to claim 1, wherein the organolithium compound is methyllithium, ethyllithium, propyllithium, butyllithium, amyllithium, hexyllithium, phenyllithium, naphthyllithium, methylenedilithium, ethylenedilithium, trimethylenedilithium, tetramethylenedilithium, 1,4-dilithiumbenzene, diisoprenyldilithium, dibutadieneyldilithium or distyrenyldilithium.

15. A process according to claim 1, wherein the organolithium compound is n-butyllithium.

16. A process according to claim 1, wherein the organolithium compound is n-amyllithium.

17. A process according to claim 1, wherein the polymerization is conducted in the presence of at least one 1,2-diene hydrocarbon represented by the formula, $$CH_2=C=CR^1R^2$$

wherein $R^1$ and $R^2$ represent hydrogen or alkyl groups having 1 to 8 carbon atoms and the total number of carbon atoms is 3 to 11.

18. A process according to claim 17, wherein the 1,2-diene hydrocarbon is 1,2-propadiene, 1,2-butadiene, 1,2-pentadiene, 1,2-hexadiene, 1,2-heptadiene, 1,2-octadiene, 1,2-nonadiene, 1,2-decadiene, 3-methyl-1,2-butadiene, 3-ethyl-1,2-pentadiene, 4-methyl-1,2-hexadiene, 4-propyl-1,2-heptadiene or 5-methyl-1,2-octadiene.

19. A process according to claim 17, wherein the 1,2-diene hydrocarbon is 1,2-propadiene, 1,2-butadiene, 1,2-pentadiene or 1,2-hexadiene.

20. A process according to claim 17, wherein the amount of the 1,2-diene hydrocarbon is 50 to 5000 p.p.m. to the 2-alkyl-substituted-1,3-conjugated diene.

21. A process according to claim 17, wherein the amount of the 1,2-diene hydrocarbon is 100 to 2000 p.p.m. to the 2-alkyl-substituted-1,3-conjugated diene.

22. A process for producing a 2-alkyl-substituted 1,3-conjugated diene polymer having at least 93.5% of the polymer in the cis-1,4-configuration, which comprises adding 0.01 to 100 mg. equivalent in terms of active lithium atom of a catalyst consisting essentially of the reaction product of at least one organolithium compound and carbon disulfide wherein the carbon disulfide is present in a proportion of 0.01 to 1.0 mole of carbon disulfide per atom of active lithium, per mole of a 2-alkyl-substituted 1,3-conjugated diene monomer in the presence or absence of a solvent, and effecting polymerization.

References Cited

UNITED STATES PATENTS 3,349,071   10/1967   Strobel _____ 260—94.7

OTHER REFERENCES

Wissenschaft und Technik; Kautschuls und Guinni; Chemie-Physik, by Bebb et al., November 1965, pp. 18–22.

JOSEPH L. SCHOFER, Primary Examiner

W. F. HAMROCK, Assistant Examiner

U.S. Cl. X.R.

260—84.3, 94.4